United States Patent [19]
Sciaky

[11] 3,882,299
[45] May 6, 1975

[54] ROTATING ARC PIPE WELDING MACHINE
[75] Inventor: David Sciaky, Chicago, Ill.
[73] Assignee: Welding Research, Inc., Chicago, Ill.
[22] Filed: Apr. 12, 1974
[21] Appl. No.: 460,600

[52] U.S. Cl. ............... 219/60 R; 219/97; 219/101; 219/123; 219/161
[51] Int. Cl. ........................................... B23k 9/02
[58] Field of Search ........... 219/60 R, 97, 101, 123, 219/161, 59

[56] References Cited
UNITED STATES PATENTS

| | | | |
|---|---|---|---|
| 3,164,712 | 1/1965 | Paton et al | 219/161 X |
| 3,287,539 | 11/1966 | Stevens | 219/123 X |
| 3,352,995 | 11/1967 | Lesley | 219/97 |
| 3,484,578 | 12/1969 | Sciaky | 219/123 X |
| 3,732,391 | 5/1973 | La Force et al | 219/161 X |
| 3,764,056 | 10/1973 | Edwards et al | 219/59 X |

*Primary Examiner*—J. V. Truhe

[57] ABSTRACT

An automatic pipe welding apparatus for end to end joining of pipes of large diameter. The machine incorporates means for striking an arc between the ends of two pipes to be joined together. A radial electromagnetic field traversing the gap causes the arc to travel at high speeds circumferentially along the edges of the pipes. Means are provided for internally clamping and holding the two pipes at a pre-set distance from one another during the arcing period, along with means for forging the weld. Control means are provided for delivering a pre-set program of electric arc current versus time.

6 Claims, 7 Drawing Figures

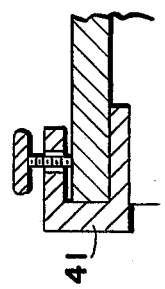
FIG. 2
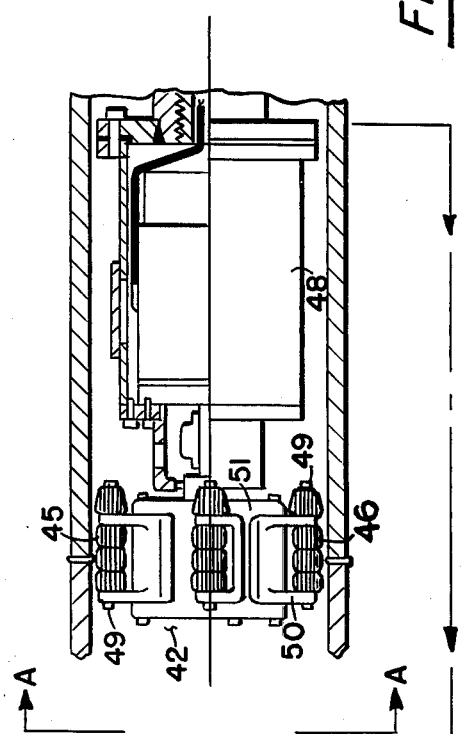
FIG. 1
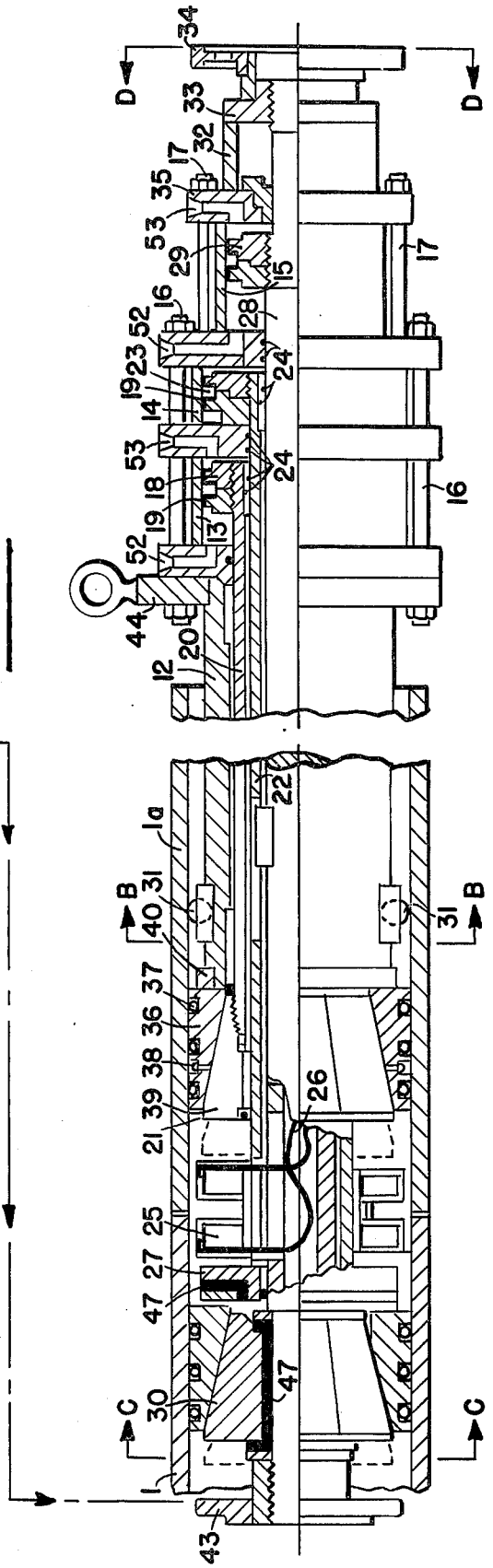

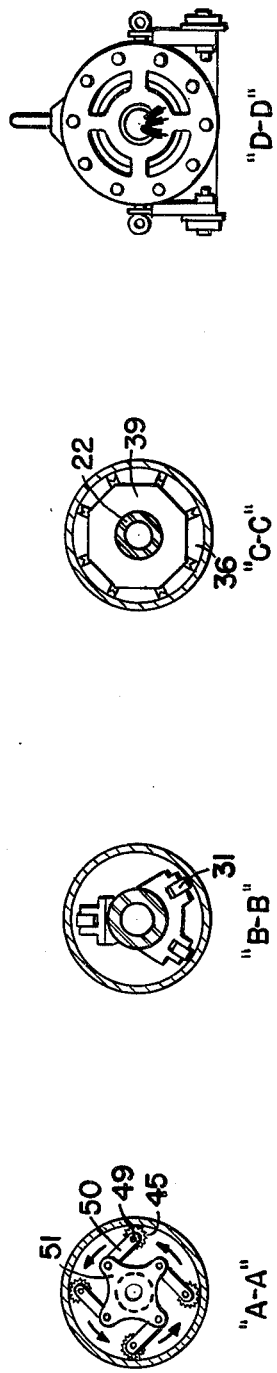
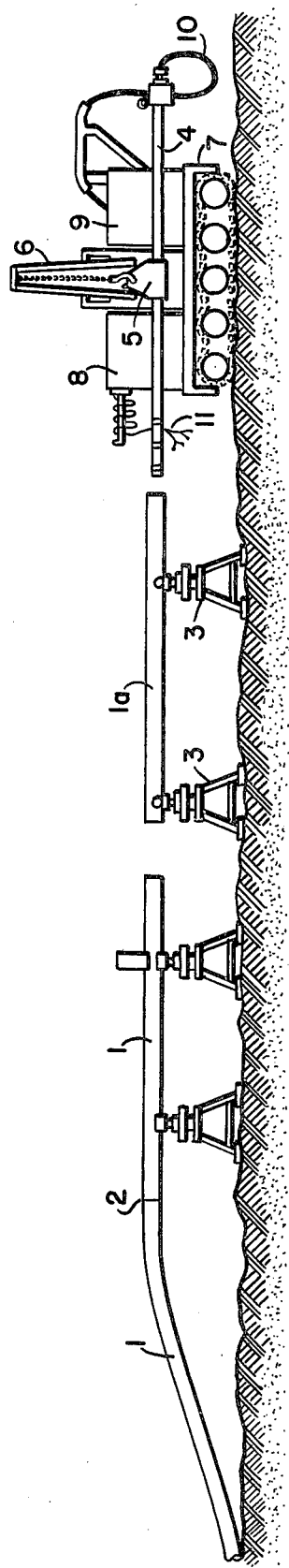

ROTATING ARC PIPE WELDING MACHINE

This invention relates to pipe welding apparatus and, more specifically, to pipe welding apparatus wherein the welding is performed by means of a rotating electric arc. With the discovery of petroleum and the widespread use of petroleum products, especially since the invention of the automobile, it became necessary to transport large quantities of petroleum to the refinery and from the refinery to the user. The most economical method for transporting this material was found to be by means of pipe lines which are constructed by welding pipes end to end from lengths as are furnished by pipe mills. The pipes may be as long as 40 feet and range in diameter from less than 6 inches to 48 inches and in wall thicknesses from one-eighth to three-fourths inch. The pipes are usually welded end to end by the manual arc welding process. Welding by this method is a costly procedure inasmuch as the arc welding process proceeds at a slow rate, requires the use of highly skilled and experienced welders, and, because of the inconsistency of the process, much repair welding must be done in order to correct defects in the weld which are found only after a non-destructive examination of the finished weld. Manual arc welding also requires a multiplicity of welding passes in order to weld the material over its full thickness making necessary the cleaning of the weld bead surface after each pass so as to remove the scale which forms during welding. This results in a very low rate at which pipe can be laid down and the working pace of the usually large crew which lays down the pipeline is slowed down. This results in high construction costs. In addition it is necessary to utilize the most highly skilled welders to produce the root pass, with men less skilled following up on the filler passes.

Within recent years attempts have been made to produce automatic pipe welding machines which would require only a semi-skilled worker to operate the machine. These machines have had but a limited success, if any, due to the complexity of the apparatus and because of the many welding parameters that had to be regulated during the welding operation in order to produce a satisfactory weld. What was gained in welding speed was very often lost in the time required in setting up the machine around the pipe and in machine maintenance. The welding process usually used on these machines was the metal inert gas method in which an arc is struck between the pipe and the consummable filler wire between which the arc is struck. The filler wire and a portion of the walls of the edges to be welded are melted by the arc and upon coalesence form the weld. With this method it is usually necessary to utilize back up bars inside the pipe in order to prevent the molten metal from falling through, although in some cases the ends of the pipe are prepared prior to welding with a shape such that when the end of one is placed in close proximity (0.060 inch) to the end of the other a groove is formed which may be filled with filler wire having a diameter of approximately 0.040 inch in order to form the weld. With such a close spacing no back up bars are needed, however this method becomes very difficult to accomplish in the field because of the extremely narrow spacing tolerances required to practice the process and the difficulty in keeping the working accuracy of the machinery. In the above mentioned machines the pipes are clamped and supported by a structure which surrounds the pipe.

In the present invention the welding is accomplished by the rotating arc method of welding and novel means are utilized which clamp the two pipes and space their ends at the proper distance required for welding entirely from the inside of the pipe.

The present invention has as an object the automatic welding of one pipe to another.

A further object is to provide a means for clamping two pipes at a pre-determined distance from each other by internal clamping means.

Another object is to provide a machine by which pipes may be welded end to end by means of the rotating arc method.

Another object is to provide an automatic welding machine which does not require the addition of filler wire to the welded area.

Another object is to provide an automatic pipe welding machine which does not require an operator highly skilled in arc welding.

Another object is to provide an automatic pipe welding machine by which pipes may be welded at high rates of speed.

The invention may be better understood by referring to the drawings in which:

FIG. 1 is a side view in section showing the essential parts of the machine.

FIG. 1a illustrates sectional views at various positions on FIG. 1.

FIG. 2 illustrates the application of a gaging tool to the end of a pipe to be welded.

FIG. 3 is an illustration of the machine in use in overland laying of a pipe line.

Figure 4B:
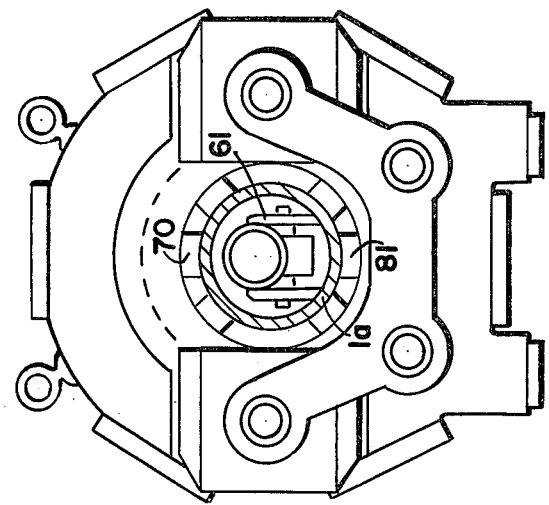
FIGS. 4, 4a and 4b are drawings of various views in partial section of a machine incorporating additional external clamping and forging means.

Referring now to FIG. 3 which illustrates the use of the machine for the overland laying of a pipe line, we see at the left several pipes, 1, which have been joined together at 2. A section of pipe to be welded to the pipe line is supported upon adjustable roller guide supports 3 with one end approximately four feet from the end of the section of pipe 1 already welded in place. The welding machine 4 is supported by sling 5 which is suspended by the crane boom 6 which is mounted on tractor 7. A welding current source 8 is mounted on the tractor, as is a hydraulic pump 9 from which hydraulic lines 10 are drawn, chip evacuating equipment and electrical controls. The hydraulic lines are connected to hydraulically operated force producing devices within the machine 4. In operation the end of the machine 4 is inserted into the section of pipe 1a supported by the roller guide supports 3 so that the end extends from the opposite end of this pipe. A gage 41 is inserted into its end so as to properly position the machine within the pipe. The pipe is clamped, the gage removed and the end of the machine 4 is then introduced into the pipe 1 whose opposite end has already been welded. Pipe 1a is brought into contact with pipe 1 which is then clamped to the machine. Thereupon the pipes are automatically separated by a well determined amount, for example 0.060 inch, the arc current conductors 11 attached to each of the pipes and the pipes then welded and forged. The inner weld bead which results from this upsetting operation is then removed by the inner bead cleaning tool 42 and the welding machine 4 is then removed from the pipe and preparations made for the welding of an additional length of pipe.

FIG. 1 is a side elevation in section which illustrates the essential parts of the pipe welding machine which is inserted within the pipe and which includes the apparatus for internally clamping the pipes, apparatus for controlling the motion of the arc, apparatus for applying the clamping forces and the upsetting force to the workpieces and the apparatus for cleaning the inner beads formed during upset. The equipment comprises a steel tube 12 whose length is approximately the length of the longest pipe to be welded to whose end is welded a flange 44 to which are attached three hydraulic cylinders 13, 14 and 15 which are held together in tandem by means of tie rods 16 and 17. The hydraulic cylinders, one behind the other, are concentric with the support tube 12. A piston 18 is arranged inside the cylinder 13 and fastened to one end of tube 20 which is telescoped within tube 12 and which has fastened to its opposite end the front clamp mechanism 21. Cylinder 14 incorporates piston 23 in slideable relationship with its inner wall which is fastened at one end to tubing 22 telescoped within tubing 20 but separated therefrom so that it is free to slide within tubing 20. Fastened to the opposite end of tubing 22 are solenoid coils 25 which are to be positioned one on each side of the gap between the pipes to be welded and by which the magnetic field which causes the arc to rotate is produced when current is passed through the solenoid coils thru conductors 26. A rear clamp stop 27 is fastened to the end of tubing 22 approximately one inch from the end of the solenoid coil 25. Hydraulic cylinder 15 which operates the rear clamp and provides the upsetting force after welding incorporates piston 29 which is fastened to the inner telescoping tube 28 to whose opposite end is fastened the rear clamping mechanism 30. Both the rear and front clamp are shown in the clamped condition, the front clamp being clamped inside of the pipe which is to be welded to the end of the pipe line. Rollers 31 are provided at several points along the tubing 12 in order to allow the machine 4 to be rolled inside the section of pipe to be welded to the pipe line.

A means for providing a precise gap between the pipes to be welded is provided by gapping parts 32, 33 and 34. Part 32 is a cylinder which is welded to the end plate 35 of cylinder 15. Wheel 35, welded to flange 33 which is threaded internally and screwed over threads formed on the inner tube 28, is utilized to rotate the flange 33 to set the machine to the desired gap. Each piston within its respective cylinder is provided with sealing means 19 at its outer periphery and O-ring seal means around its inner circumference so as to effectively form within each cylinder a left chamber and a right chamber. The left and right chambers are provided with passageways 52 and 53 respectively for connection through suitable valves to a source of fluid which is maintained at a high pressure by means of a hydraulic pump. By introducing hydraulic fluid under pressure through passageway 52 and removing it from passageway 53 the piston will be moved towards the right. By reversing the action, that is feeding hydraulic fluid into passageway 53 and out of passageway 52 the piston 18 will be moved towards the left.

The front clamping mechanism 21 comprises eight front clamping segments equally spaced around member 39 which is machined in the shape of a frustrum of an eight sided pyramid. The outer surface of the pyramid is free to slide against the surfaces of the segments which are in contact with the pyramid. The segments are free to move radially but are restrained from moving towards the right by stop 40 which is welded to the end of the outer tubing 12. Continuous springs 37 apply a force to the eight segments which urges them to move inwardly in the radial direction. When piston 18 in the front clamping cylinder 13 is caused to move towards the left by passing hydraulic fluid through passageway 53 into its right chamber the pyramid shaped section of the clamp will move towards the left and the segments will move towards the center of the tubing so as to unclamp the pipe. Causing the piston to move towards the right will cause the clamping segments to move outward and clamp the pipe. Likewise applying hydraulic fluid to the left side chamber of cylinder 14 will cause rear clamp stop 27 to move to the right. Filling the left-hand chamber of cylinder 15 will cause the rear clamps 30 to fasten the pipe into which it is inserted and filling the right hand chamber will release the rear clamps.

The steps that are followed in welding a pipe section to the end of the pipe line are as follows:

With the machine at rest, the right chamber of cylinder 13, the left chamger of cylinder 14 and the right chamber of cylinder 15 are filled with hydraulic fluid under high pressure. In this condition the rear clamp stop 27 is to the right and the right and left clamps are released. A positioning gage 41 is inserted in the end of the pipe to be added to the line and the machine 4 inserted into the opposite end of the pipe until stopped by the gage. The right hand pipe is clamped at this time by applying hydraulic fluid to the left chamber of cylinder 13. The rear clamp and the inner bead cleaning tool 42 will be protruding from the pipe. The gage 41 is removed from the end of the pipe and the inner bead cleaning tool and rear clamps inserted into the end of the pipe line until the pipe ends adjoin one another. The machine is now clamped to the end of the pipe line by filling the left chamber of cylinder 15. The welding machine is now clamped to the pipe line and to the pipe to be welded. The desired gap is adjusted by turning wheel 34 so as to obtain a gap of the desired length between the end of the cylinder 32 and flange 33. At this time hydraulic fluid under pressure is fed to the right hand chamber of cylinder 14 which causes the outer tubing 12, the front clamp 21 and the pipe to move towards the right until the gap between 32 and flange 33 is closed. This will provide a gap between the pipes equal to the gap which was preset between parts 32 and 33. The conductors from the power supply are then connected to the pipes. Current is supplied to the solenoids 25 through conductors 26 from the power supply mounted on the tractor and the arc current power supply energized for a pre-set interval of time as required for the particular pipe being welded. At the instant the current flow is terminated the left chamber of cylinder 14 is filled with fluid and the hydraulic pressure inside the left-hand chamber of cylinder 15 is increased abruptly causing tubing 12 and the right-hand pipe to move towards the left against the left-hand pipe so as to upset and forge the weld. The upset creates a bead 46 approximately one-eighth inch thick on the inner periphery of the pipe which must then be removed. This is accomplished by releasing both clamps and moving the machine to the right for a distance great enough so that the cutting tools 45 on the inner bead cleaning tool 42 are centered at the bead. The inner bead cleaning tool cutting wheels 45 are supported on pins 49 which are carried on swing frames 50 which pivot outwardly due to centrifugal force when the spider 51 upon which the swing frames are carried is caused to rotate. The cutters 45 thus will clear the bead when the cleaning tool is not rotating but will move outwardly and cut the bead when the motor is energized. The left chamber of the front clamping cylinder 13 is then filled with fluid so as to clamp the pipe, the driving motor 48 for the cutting tool 45 is energized and the inner bead cleaning tool 42 moved to the left. This latter is accomplished by applying hydraulic fluid to the right-hand chamber of cylinder 15 causing the inner tube 28 which carries the inner bead cleaning tool to move towards the left with respect to the pipe. After the bead is removed and chips evacuated by means of a suction device the machine is completely withdrawn from the pipe, the tractor moved forward and a new section of pipe put in place and made ready for welding.

The welding of the pipes in the machine described above is accomplished by means of an electric arc which is struck between the ends of the two pipes to be welded and which is then caused to move in the circular path defined by the end of the pipes at a speed which may reach as high as 200 meters/second. The arc motion is caused by applying a magnetic field which passes radially through the gap between the ends of the pipes being welded. The reaction between the magnetic field created around the arc due to current passing between the ends of the two pipes and the radial magnetic field causes the arc to move in a circular path. Attempts have been made to weld pipes utilizing direct current sources for both the solenoids supplying the magnetic field and the supply for the high arc current but the welds produced with these power sources proved to be defective in two respects. One, a crater formed along the edge of one of the parts and there was a build-up of metal on the end of the second part. The build-up occurred on the end of the pipe connected to the positive terminal of the high power arc welding current source. Two, it was also found that the end of the pipe connected to the negative or cathode terminal of the arc power supply was raised to a temperature much higher than that reached by the pipe connected to the positive terminal. In order to obtain the desired temperature at the end of the pipe connected to the positive terminal it was necessary to increase the current. This increase caused an excessive heating of the pipe connected to the cathode terminal resulting in an excessive annealing of the pipe and an inability to forge the material during the upset period because of the amount of material that had become plastic. The increased heating also caused an excessive amount of material at the edges of the pipe to become decarburized so that after upset an excessive amount of decarburized steel was present in the joint. This produced a weld area having a lower tensile strength than the parent metal and of reduced hardness.

It was discovered when using an AC source in the welding of pipes having an outer diameter of 2⅞ inches and an inner diameter of 2½ inches that the use of a welding program wherein the arc is initiated with as low a current as will sustain an arc and then increase continuously in accordance with a parabolic law and then maintained for a short period at a plateau at high current improved the welding results substantially. Excellent results were obtained and welds that did not suffer from the defects mentioned above were realized. In one practical case an arc current of 500 amperes was maintained for 6 seconds followed by a current of 900 amperes for a period of one-half second.

The use of an alternating current arc source in conjunction with a high frequency spark to initiate the arc at the start of each half cycle resulted in a uniform heating of both pipes being welded with no transfer of material from one pipe to the other. When utilizing two solenoid coils in opposition fed from a direct current power supply to produce the radial field through the gap between the pipes being welded it was found that a magneto motive force of 6,000 ampere turns per coil would move the arc at a velocity of approximately 120 meters per second or one meter for each one-half cycle of the 60 cycle supply line. By utilizing an arc current programming control wherein the material is heated by a low current alternating current arc initially and then increasing the current and consequently the temperature of the metal rapidly a very thin layer of molten material at high temperature forms at the surface of both pipe ends. During upset at high force this thin layer supported by the plastic material behind it is squeezed out and a sound weld will form from the plastic material which has not been greatly oxidized inasmuch as: (1) it was behind the end surface, and, (2) it was not subjected to a very high temperature for a long time so that a minimum of oxidation and decarburization was produced. Furthermore, because the volume of plastic material produced is limited through the use of the arc current program, the forging of the material is improved inasmuch as the upset force is better transmitted to the welded area because of the more solid base behind the molten zone. In order to generate the parabolic rise in current one may use a motor operated variable transformer or a saturable reactor controlled by suitable programmable controller.

In order to properly forge the welded area of the 12 inch pipe, an upset force of 135,000 lbs. is required. The internal clamping force necessary to round out the pipe ends and prevent slippage of the pipes during the upset is 202,000 lbs. for each of the clamps. Because of the clamping and upset force requirements the tandem array of clamping and upsetting hydraulic cylinders is of such a diameter that the cylinders will not pass through the 12 inch pipe so that the total length of the machine which must be inserted in the pipe is greater than the length of the pipe to be welded to the pipe line. Because of the weight of the machine, it is found that when the machine is clamped to the pipe and supported at its opposite end that the machine will sag and because of the sag it is determined that a machine of a length that is required to weld a pipe of 24 feet is the largest machine that can be made which will accept pipes which have been manufactured under the recognized pipe standards. A longer machine would sag excessively and not allow the machine to be inserted into the pipe without interference.

Figure 4A:
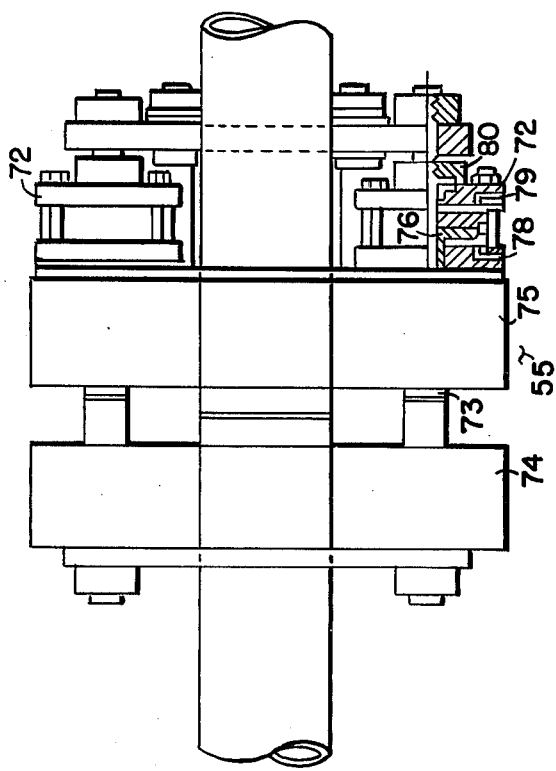
Figure 4:
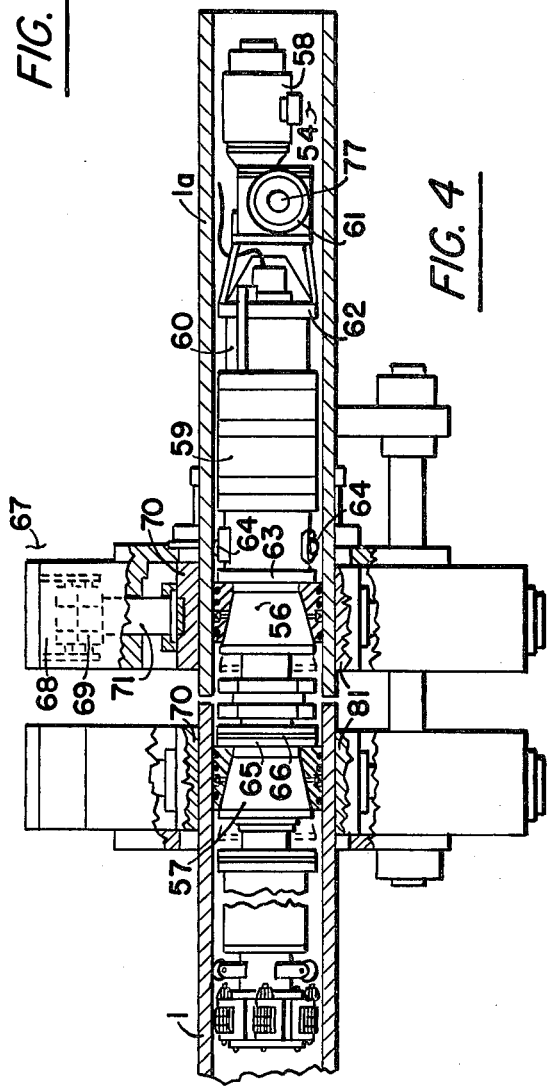

In order to allow the welding of pipe sections in excess of 24 feet the basic machine of FIG. 1 has been modified as is illustrated in FIG. 4. In this second version of the rotating arc pipe welding machine the two pipe sections to be welded together are aligned through the use of internal clamps which are constructed in a similar manner to the clamps utilized in the structure shown in FIG. 1 but are operated at lower force. The operating cylinders required are smaller in diameter and will readily fit within the pipe so that a relatively short mechanism is required to be inserted inside the pipes to be welded. Since the portion of the machine to be inserted within the pipe is relatively short, there is no sag problem and therefore no limitation is placed upon the length of pipe which may be welded. The internal clamps are used for the rounding, alignment and initial positioning of the pipes. An outer set of clamps and operating cylinders is placed outside the pipes to be welded and furnishes the high clamping and upsetting forces required to properly forge the pipes.

FIGS. 4, 4A and 4B are views of the apparatus for welding pipes end to end which incorporates a self-propelled centering mandrel 54 which is utilized to hold the two pipes that are going to be welded in alignment prior to clamping, welding and upsetting. The centering mandrel consists of a front clamping cylinder 59 and rear clamping cylinder 60 which operate respectively front clamp 56 and rear clamp 57 in the manner explained above in the description of the internally clamped machine. The centering mandrel is supported within the pipe by wheels 64 and drive wheels 61. Reversible gear motor drive 58 to which drive wheels 61 are keyed upon drive shaft 77 is fastened to the flanged end-plate 62 of rear clamp cylinder 60. An inner bead cleaning tool is fastened to the flange 78 at the left end of the centering mandrel, to the left of the rear clamp 57.

The upset and clamping mechanism 55 comprises two supporting ring structures 74 and 75, each of which is provided with six hydraulic cylinders 67 arranged equa-distance from one another about the periphery of the rings so that they may exert forces radially upon the pipes to be welded and clamp the pipes with a total clamping force in excess of 200,000 lbs. Fixed to supporting structure 74 are two rods 73 which support structure 75 and allow structure 75 to move in relation to 74 along their common axis by sliding over the rods 73. A pair of hydraulic upsetting cylinders 72 are fixed to the structure 75. The cylinders are provided with pistons 76 which are fastened to shaft 73. When a hydraulic fluid at high pressure is introduced through port 78 into the left-hand chamber of cylinder 72, the piston will move to the right with respect to the structure 75 to which the cylinders 72 are fastened. This will apply a force in excess of 135,000 lbs. between the ends of the pipes which are clamped by the two groups of clamping cylinders which is sufficient to properly forge the thickest walled pipe to be welded. By introducing hydraulic fluid through port 79 into the right-hand side chamber of cylinder 72 the piston 76 would be urged to the left while the cylinder 72 will move to the right until its motion is stopped by the piston stroke adjustment nut 80.

In a typical overland pipe laying operation, the clamping and upset structure which is suspended by a lifting boom mounted on a tractor is positioned coaxially over the pipe at a distance of five feet from the end of the welded pipe line. The pipe to be welded is placed on two adjustable height roller guide supports and positioned so that the pipe ends to be welded are 5 feet apart. The inner centering mandrel 54 is introduced into the rear end of the pipe to be welded and the motor 58 energized so that the mandrel becomes self-propelled and is allowed to move until it protrudes by approximately 38 inches from the opposite end of the pipe. A gage tool is placed and positioned by a pin on the top of the mandrel rear clamp back-up 65 and the mandrel moved backwards within the pipe until the gage tool butts up against the front end of the pipe to be welded. The mandrel front clamp 56 is made to expand by actuating its hydraulic cylinder 59 and the gage then removed. The pipe to be welded 1A, which is now solid with the mandrel 54, is rolled by hand up against a "gap gage" which has been placed on the end of the welded pipe line. The thickness of the gage blade determines the separation between the pipes across which the arc is to form. The rear clamp 57 of the mandrel which is electrically insulated from front clamp 56 by insulation 66 is made to expand by actuating the rear clamp cylinder 60 and the gap gage then removed. The outer clamping machine 55 is then moved by the tractor until the vertical center plane of the clamping machine is in line with the center line of the arc gap. The six upper clamps 70 (three on the left-hand reaction ring supporting structure and three on the right-hand) of the clamping machine, supported by their respective piston rods 71, are brought down against the upper surfaces of the pipes simultaneously by introducing fluid under high pressure into chambers 68 of their respective hydraulic cylinders. This causes the clamping machine to move upward and away from its support until the pistons 69 stop against the bottom of their cylinders 67. The six lower clamps 81 (three on the left-hand reaction ring, and three on the right-hand) of the clamping machine are now brought up by actuating their cylinders. The two pipe ends are now gripped by the combined clamping force of the six left-hand and the six right-hand cylinders. The two arc current cables are connected to the two pipes at a distance of approximately 12 inches from the gap and the rotating arc initiated by depressing a push button on the electric controls of the arc current source, the electro-magnetic arc driving coils and of the arc starting electrodes. The arc current is interrupted after a period as determined by a pre-set timer, the inner mandrel front clamp is retracted and the upset cylinders 80 are energized to initiate the upset or forging force. The welding operation is now completed, the upset force is reduced to zero, the cables disconnected, the inner mandrel rear clamp released, and the mandrel assembly caused to move back, by energizing the gear motor 58, until it reaches a pre-established position at which point the inner bead cleaning and chip evacuating operation is initiated. After the bead cleaning operation the centering mandrel is removed from the pipe and preparations are made to place a new section of pipe in position and make ready for welding.

The invention is not to be limited to or by details of construction of the particular embodiment thereof illustrated by the drawings, as various other forms of the device will, of course, be apparent to those skilled in the art without departing from the spirit of the invention or the scope of the claims.

What I claim is:

1. An apparatus for welding girth joints between the adjacent ends of pipes laid end to end comprising:
   a tube approximately equal in length to the longest pipe to be welded;
   three hydraulic cylinders fastened in tandem to one end of the said tube, each cylinder forming a sealed chamber of annular form coaxial with the longitudinal axis of the said tubing;

a second tube telescoped and slidable within the first tube, one end of said second tube fastened to a piston slidable within the first of said annular chambers and having fastened at its opposite end a means for clamping the said pipe to the said second tube;

a third tube telescoped within the said second tube and fastened at one end to a second piston which is slidable within the second of said group of cylinders in tandem, the said third tube having fastened close to its other end and concentric with its axis a pair of solenoid coils separated from each other by a distance of approximately 1 inch;

a disk whose outer diameter is approximately 2 inches less in diameter than the inside diameter of the pipe mounted over the end of the said third tube;

a fourth telescoping tube within the said third tube whose one end is fastened to a third piston slidable within the third cylinder in tandem and extending beyond the third piston, the other end of the said fourth tube extending beyond the end of the said third tube and having fastened to it beyond the end of the third tube a second clamping device electrically insulated from said fourth tube for clamping the second of two pipes to be welded together;

flange means fastened to the end of said fourth tube for retaining the said second clamping means in a fixed position on the outer surface of the said tubing, said flange having means for supporting an inner bead cleaning tool on its outer surface so that the tool lies along the axis of the said tubing; and means for producing an alternating current arc between the ends of the pipes to be welded.

2. An apparatus as in claim 1 in which the clamping means comprises an inner section in the shape of the frustrum of an eight sided pyramid, eight clamping segments surrounding the said inner section each of which has an inward facing surface in contact with one of the eight sides of the said pyramid and an outward facing surface in contact with the inner wall of the pipe to be clamped, a multiplicity of continuous springs arranged in grooves formed circumferentially along the outward facing surfaces of the said segments, the said springs urging the said segments radially and inwardly away from the inner surface of the said pipe.

3. An apparatus as in claim 1 in which the said pair of solenoid coils is fed from a direct current source whose output current is adjustable.

4. An apparatus as in claim 1 including means connected to it for controlling the arc current so that it follows a pre-set program of arc current versus time.

5. An apparatus as in claim 4 including means for controlling the arc current so that it follows a parabolic law with respect to time.

6. An apparatus as in claim 1 including means for adjusting the gap between the adjacent ends of two pipes to be welded.

* * * * *